United States Patent [19]

Yanai et al.

[11] Patent Number: 5,381,539
[45] Date of Patent: Jan. 10, 1995

[54] SYSTEM AND METHOD FOR DYNAMICALLY CONTROLLING CACHE MANAGEMENT

[75] Inventors: Moshe Yanai, Framingham; Natan Vishlitzky, Brookline; Bruno Alterescu, Newton; Daniel Castel, Framingham, all of Mass.

[73] Assignee: EMC Corporation, Hopkinton, Mass.

[21] Appl. No.: 893,509

[22] Filed: Jun. 4, 1992

[51] Int. Cl.[6] ............................................. G06F 12/08
[52] U.S. Cl. .................... 395/425; 364/DIG. 1; 364/243.41; 364/246.12
[58] Field of Search ... 364/200 MS File, 900 MS File; 395/425

[56] References Cited

U.S. PATENT DOCUMENTS

| | | | |
|---|---|---|---|
| 4,414,644 | 11/1983 | Tayler | 395/425 |
| 4,489,378 | 12/1984 | Dixon et al. | 395/425 |
| 4,621,320 | 11/1986 | Holste et al. | 395/425 |
| 4,638,425 | 1/1987 | Hartung | 395/425 |
| 4,794,521 | 12/1988 | Ziegler et al. | 395/425 |
| 4,807,110 | 2/1989 | Pomerene et al. | 395/425 |
| 4,821,185 | 4/1989 | Esposito | 395/275 |
| 4,853,846 | 8/1989 | Johnson et al. | 395/325 |
| 4,860,192 | 8/1989 | Sachs et al. | 395/400 |
| 4,884,197 | 11/1989 | Sachs et al. | 395/425 |
| 4,888,679 | 12/1989 | Fossum et al. | 395/800 |
| 4,888,689 | 12/1989 | Taylor et al. | 395/425 |
| 4,888,773 | 12/1989 | Arlington et al. | 371/40.2 |
| 4,899,275 | 2/1990 | Sachs et al. | 395/425 |
| 4,928,225 | 5/1990 | McCarthy et al. | 395/425 |
| 4,933,845 | 6/1990 | Hayes | 395/325 |
| 5,134,563 | 7/1992 | Tayler et al. | 395/250 |
| 5,253,351 | 10/1993 | Yamamoto et al. | 395/425 |

Primary Examiner—Joseph L. Dixon
Assistant Examiner—Matthew M. Kim
Attorney, Agent, or Firm—Daniel J. Bourque; Anthony G. M. Davis; Michael Bujold

[57] ABSTRACT

A cache management system and method monitors and controls the contents of cache memory coupled to at least one host and at least one data storage device. A cache indexer maintains a current index of data elements which are stored in cache memory. A sequential data access indicator, responsive to the cache index and to a user selectable sequential data access threshold, determines that a sequential data access is in progress for a given process and provides an indication of the same. The system and method allocate a micro-cache memory to any process performing a sequential data access. In response to the indication of a sequential data access in progress and to a user selectable maximum number of data elements to be prefetched, a data retrieval requestor requests retrieval of up to the selected maximum number of data elements from a data storage device. A user selectable number of sequential data elements determines when previously used micro-cache memory locations will be overwritten. A method of dynamically monitoring and adjusting cache management parameters is also presented.

40 Claims, 5 Drawing Sheets

SYSTEM AND METHOD FOR DYNAMICALLY CONTROLLING CACHE MANAGEMENT

FIELD OF THE INVENTION

This invention relates to computer systems and more particularly, to a system and method for improved management of cache memory.

BACKGROUND OF THE INVENTION

Computer systems which are coupled to a large amount of data storage may spend a great deal of CPU and BUS time reading and writing data to and from the storage devices. Data retrieval from disk drives or similar data storage devices tremendously impacts and decreases system performance and throughput.

Accordingly, many systems now include cache memory which can be accessed much more rapidly by the CPU without the inherent delays associated with the mechanical motion and time delay inherent in a disk drive. Thus, if the required data is stored in cache instead of on the disk drive, system performance can be increased tremendously. Cache memory, however, is a finite resource. It is costly and accordingly, must be properly managed to yield its intended benefit.

Prior art systems or methods aimed at managing cache memory include a system disclosed in U.S. Pat. No. 4,489,378 wherein the system prefetches a selected number of records in anticipation that the data will soon be requested. Several problems, however, exist with such a system. For example, the system has no knowledge of what is already stored in cache and thus, the system must make real time decisions as to whether or not a sequential data access is being performed. Further, the system prefetches a selected number of data elements without regard for what is currently in cache. Most importantly, such a system is not efficient when used with a multi-tasking/multi-processor system wherein a storage device controller is handling requests in a multiplexed fashion from many hosts. In such a case, multiplexed sequential data access would appear as a non-sequential or random data requests to the cache manager and the desired data would not be present in the cache due to the non-sequential appearance of the task.

An additional prior art system for controlling or managing cache memory is disclosed in U.S. Pat. No. 4,853,846 wherein a cache memory directory is split up into as many segments as there are processors or hosts which are accessing the memory. Given the associated high cost of cache memory, such a system results in expensive, duplicative cache memories. In addition, such a system is also incapable of handling multi-tasking systems given that the system requires a dedicated cache directory associated with each accessing host or processor.

Further, both referenced prior art systems as well as other similar prior art systems are not capable of allowing the user to establish selectable thresholds or criteria to determine the threshold for determining that a sequential task is indeed in progress, the number of data records to prefetch once a sequential task has been identified, and the size of cache memory to allocate to a given task.

SUMMARY OF THE INVENTION

A cache management system and method is disclosed which allows a single cache memory to be utilized in a multi-tasking or multi-processor environment without the need for creating multiple cache directories. Additionally, the cache management system and method allows the user to establish selectable thresholds and criteria for each and every physical or logical storage device coupled to the data processing system, thus allowing the criteria to be selected on a process-by-process basis.

The present cache management system and method provides for monitoring and controlling the contents of cache memory which is coupled to at least one host and to at least one data storage device. Such a system maintains a current index of data elements which are stored in the cache memory.

A sequential data access indicator is responsive to the cache index and to a selectable sequential data access threshold provided by the user, for determining that a number of sequential data elements have been requested which exceeds the sequential data threshold, thus indicating that at least one occurrence of a sequential data access is in progress by a given process executing on the host, and for providing an indication of that determination.

In response to the indication of a sequential data access in progress provided by the sequential data access indicator, a micro-cache memory in the form of a circular "loop" is established in the main cache memory for each and every process having a sequential data access in progress. Subsequently, a data retrieval requestor requests retrieval or prefetching from a data storage device coupled to the system, of up to a user selectable predetermined number of data elements to be prefetched.

In one embodiment, the cache management system further includes a cache data replacer, which is responsive to a user supplied selectable predetermined maximum number of sequential data elements which are to be stored in the cache memory for a given process, for replacing or over-writing the least recently used sequential data elements in excess of the predetermined maximum number of elements established by the process parameters set up by the user.

In a preferred embodiment, the current cache index is maintained in the system wide global memory, and may be organized by physical or logical data storage device. In such an embodiment, the cache memory is typically a high speed semiconductor memory.

The presently described cache management system also includes a method for monitoring and controlling the contents of cache memory coupled to at least one host and to at least one data storage device. The method includes establishing and maintaining a cache directory of the current contents of the cache memory. User selectable criteria are established including a sequential data access threshold, for providing a predetermined minimum number of data elements stored in the cache memory indicating the occurrence of a sequential data access in progress by at least one host system.

After scanning or monitoring the cache directory, and in response to the user selected sequential data access threshold, the method determines that a sequential data access is in progress. In response to a user selectable predetermined number of data elements to be retrieved or prefetched from a data storage device, and to the determination of a sequential data access in progress, the established predetermined number of data elements are retrieved in response to a retrieval request.

In response to a user selectable predetermined maximum number of sequential data elements to be stored in cache memory, the method sequentially replaces in the cache data elements which exceed the predetermined maximum number established by the process parameters.

An additional feature of the presently disclosed cache manager is a dynamic monitoring and adjustment feature which provides the cache manager with the ability to monitor and dynamically alter several cache manager parameters for each process having a sequential data access in progress and thus, to monitor the effectiveness of the cache management algorithm controlling each and every sequential process, in an attempt to improve on the algorithms.

The dynamic monitoring and adjustment feature of the cache manager continuously monitors the cache index/directory once a sequential process has been detected, to determine whether the tracks or data records which have been prefetched have in fact been used by the host system. The dynamic monitoring and adjustment feature of the present cache manager will accordingly increase the sequential access detection threshold when unused tracks or records are detected, and decrease the detection threshold in response to a large number or long continuous string of used data records or tracks, thus allowing the sequential detection threshold to "float" at the optimum level for each process.

The dynamic monitoring and adjustment feature of the present cache manager also monitors and dynamically adjusts the number of data tracks or records to be prefetched as a function of the number of sequential data tracks or records which have been used. Thus, a large or lengthy sequential process will result in a higher number of prefetched data tracks or records whereas a shorter or smaller sequential process will result in fewer data tracks or records prefetched. Further, as a result of increasing the number of data tracks or records to prefetch, the dynamic monitoring and adjustment feature of the present cache manager will allow the size of the micro-cache memory "loops" for a given process to increase and decrease in size with a corresponding increase or decrease fluctuation in the number of data tracks or records to prefetch for that process.

DESCRIPTION OF THE DRAWINGS

These, and other features and advantages of the present invention will be better understood by reading the following detailed description, taken together with the drawings wherein.

DETAILED DESCRIPTION OF THE INVENTION

Figure 1:
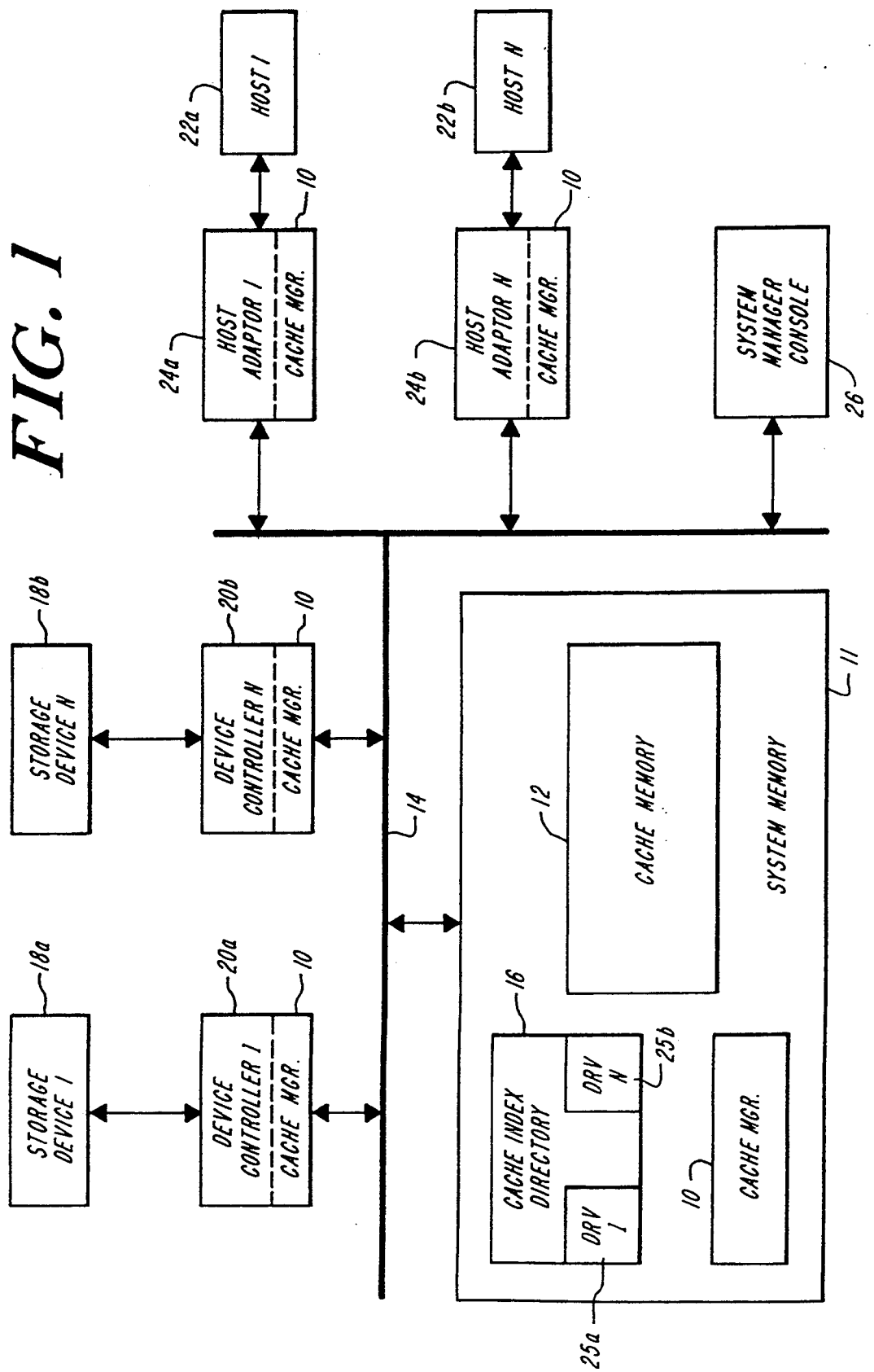
FIG. 1 is a block diagram of the cache management system of the present invention.

The cache management system for monitoring and controlling the contents of cache memory coupled to at least one host and one data storage device is shown in block diagram form in FIG. 1 and includes cache manager 10. Cache manager 10 is a virtual entity and can be resident in any one location such as system memory 11, device controllers 20a-20b and host adapters 24a-24b, or distributed over one or more of such locations.

A data processing system for use with the present cache manager includes one or more devices such as host/channel adapter boards 24a-24b which are adapted to receive data read/write commands and associated data over one or more communication channels from one or more hosts 20a-20b.

The host/channel adapter boards 24a-24b are coupled to cache memory 12 by means of bus 14. Bus 14 is also coupled to one or more data storage device controller/adapter boards 20a-20b which serve to control the reading and writing of data to or from the respective data storage devices 18a-18b. Device controller and host adapter boards are described in Applicants' co-pending U.S. patent application Ser. No. 07/587,253, now U.S. Pat. No. 5,335,352, entitled Reconfigurable, Multi-Function Disk Controller, which is incorporated herein by reference.

In one embodiment, data storage devices 18a-18b include disk storage devices, each of which may include one or more disk drives, dependent upon the user's requirements and system configuration. Additional embodiments also contemplate various data storage devices including, but not limited to, optical disks, CD ROMS and magnetic tape devices.

In order to improve data processing system performance, a data processing system with the present cache manager does not wait for device controllers 20a-20b to read or write data directly to or from the appropriate data storage device(s) but rather, data to be written to or read from the data storage device(s) is stored in temporary cache memory 12. The present cache manager is primarily directed to data storage device read requests by a host system, although managing write requests will also benefit by the use of the present cache manager. In the preferred embodiment, temporary cache memory 12 includes high speed semiconductor memory whose data is rapidly accessible to both the device controllers 20 and the host adapters 24.

In addition to storing data, temporary cache memory 12 in the preferred embodiment also includes an associated cache index/directory 16 which serves to provide an indication of the data which is stored in the cache memory and provide the address of the data in cache. The cache index/directory is comprised of one or more device tables such as tables 25a and 25b. In the preferred embodiment, the cache contents index/directory is maintained current by cache manager 10 and is located in the system memory 11.

Figure 2:
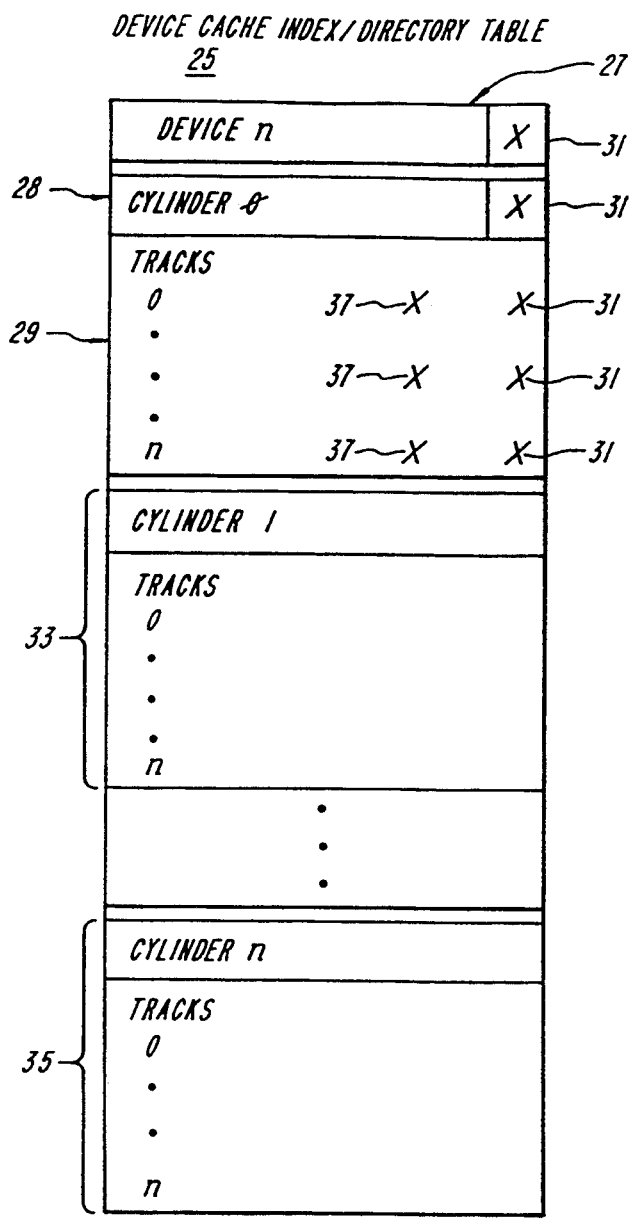
FIG. 2 is an illustration of a data storage device cache index/directory table.

The cache contents index/directory is preferably organized on a device by device basis with one "table" 25, FIG. 2, for each data storage device. Each device table is further organized by device storage elements. For example, for a given data storage device such as a disk drive, a device table 25 includes a device header 27, followed by cylinder 0 header 28, followed by cylinder 0 track information indicated generally at 29. Cylinders 1 through N follow with associated disk drive track information 33 and 35 respectively. In addition, each of the device, cylinder, or track entries in the table headers also include at least a first bit position 31 which if set, indicates that the track, cylinder, or device is stored in cache. Thus, each cache index/directory table forms a "pyramid" or hierarchy of indices which the present cache manager searches to inquire device-by-device and data storage element by data storage element whether any records from the device are stored in cache. Also included in each of the track entries is a second bit position 37 which is reset once the prefetched track (or record) has been used by the host. The usefulness of this bit will be further described below. Such a device by device cache index/directory is also described in detail in Applicants' co-pending U.S. patent application Ser. Nos. 07/586,254 and 07/586,796 (now U.S. Pat. No. 3,206,939), both of which are incorporated herein by reference.

A data processing system incorporating the present cache management system further includes a system manager console 26, FIG. 1. The system manager console 26 allows the user to input the initial default criteria for the cache management system. This allows the user to establish the initial default criteria to optimize the performance of the cache memory by tailoring the cache manager and the cache management system to the particular data storage devices, application programs being executed, or connected host systems.

The cache manager input criteria includes three elements namely: (a) the minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory locations containing the previously used tracks or data records are reused or recycled and new data written to these location(s).

The three criteria required by the cache management system are maintained by the cache manager on each device controller for each device coupled to the controller. Since most processes typically utilize data from only one data storage device, the criteria established for any given data storage device are utilized to control and manage cache for each and every process requesting data from the given storage device.

An example of the above-mentioned initial default cache manager criteria is shown in Table I below for an exemplary device controller I (20a) which controls six disk drives by means of SCSI channels 0 through 5.

TABLE I

| Device Controller I | | | | | | |
|---|---|---|---|---|---|---|
| 1. SCSI Drive Number | 0 | 1 | 2 | 3 | 4 | 5 |
| 2. Prefetch (Cache Management) Enable | Y | Y | Y | Y | Y | Y |
| 3. Min Track Seq Threshold | 2 | 2 | 2 | 2 | 2 | 2 |
| 4. Tracks Prefetch Ahead | 2 | 2 | 2 | 2 | 2 | 2 |
| 5. Max Tracks Tail to Cut | 5 | 5 | 5 | 5 | 5 | 5 |

Figure 3:
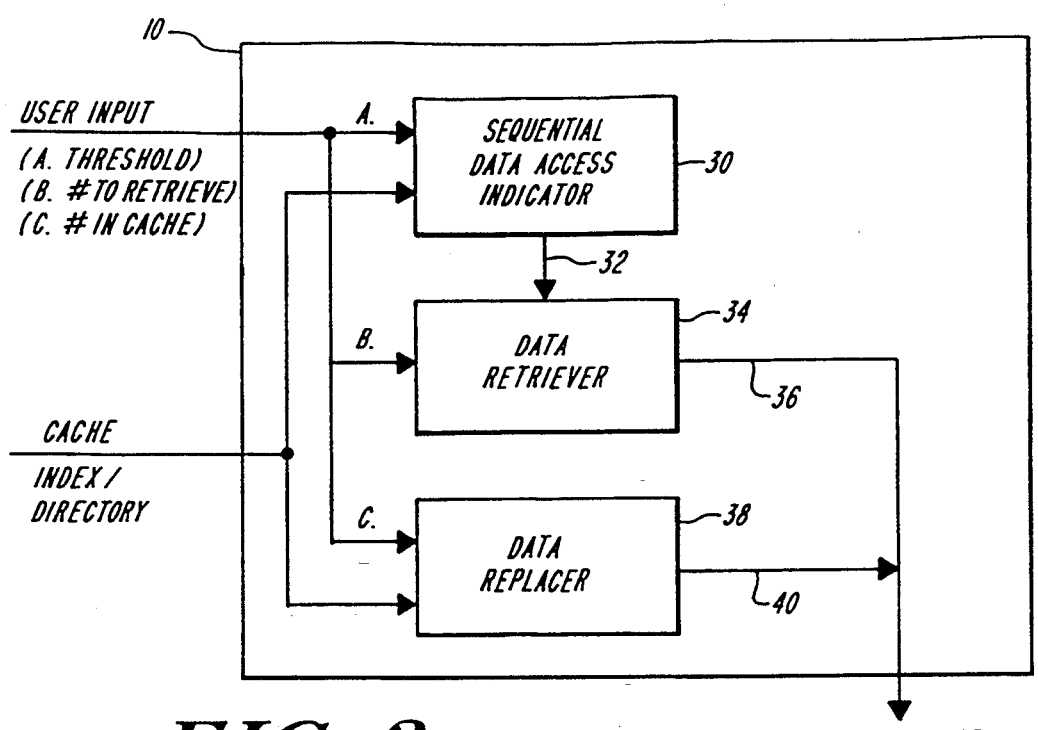
FIG. 3 is a more detailed block diagram of the cache manager of FIG. 1.

Accordingly, line 2 of the exemplary Table I indicates that prefetching (i.e. cache management) is enabled for all six drives or devices controlled by the device controller. The third line of the Table indicates that each drive has an established minimum track threshold of 2 before a sequential operation is declared. The use of such parameters and criteria by the cache manager 10 is shown in greater detail FIG. 3 wherein the sequential data access indicator 30 utilizes the threshold input (A) which for this example is 2, and input from the cache contents index/directory to provide an indication 32 of a sequential data access in progress. Since application programs or "jobs" typically run entirely on one disk drive or other data storage device, the cache manager can selectively determine on a process-by-process basis the threshold criteria to be established by establishing the initial default criteria for each data storage device.

Upon receiving an indication 32 that a sequential data access is in progress for a given process, data retriever 34 utilizes the second criteria (B) that is, the maximum number of tracks to prefetch ahead, to provide a request 36 to the appropriate data storage device controller to fetch the next sequential track or data record for the given process. Since the user knows which processes will be executing on which data storage devices, the initial value of this parameter may be adjusted to maintain a balance between having the proper number of records or tracks prefetched versus prefetching too many records or tracks. It should be noted that prefetching too many tracks will seriously impact the performance of the data processing system by causing the data storage device controller to spend large amounts of time prefetching data which will not likely be used or will not be used for a long period of time to come.

Finally, the third parameter (C) is the maximum number of data records to be maintained in cache for this process before the records stored in cache memory for this process are overwritten. Thus, in the present example, Table I indicates that five tracks or data records are maintained in cache before the least recently used (LRU) track or data record is replaced or overwritten in the cache.

Accordingly, data replacer 38 which forms part of the cache manager 10 receives the third criteria or parameter as well as cache contents index/directory information to provide an indication 40 to the data storage device controller to control the reuse or recycling of previously used cache memory locations allocated to the given process and to reset the in-cache flag or bit associated with the data which is overwritten.

Figure 4A:
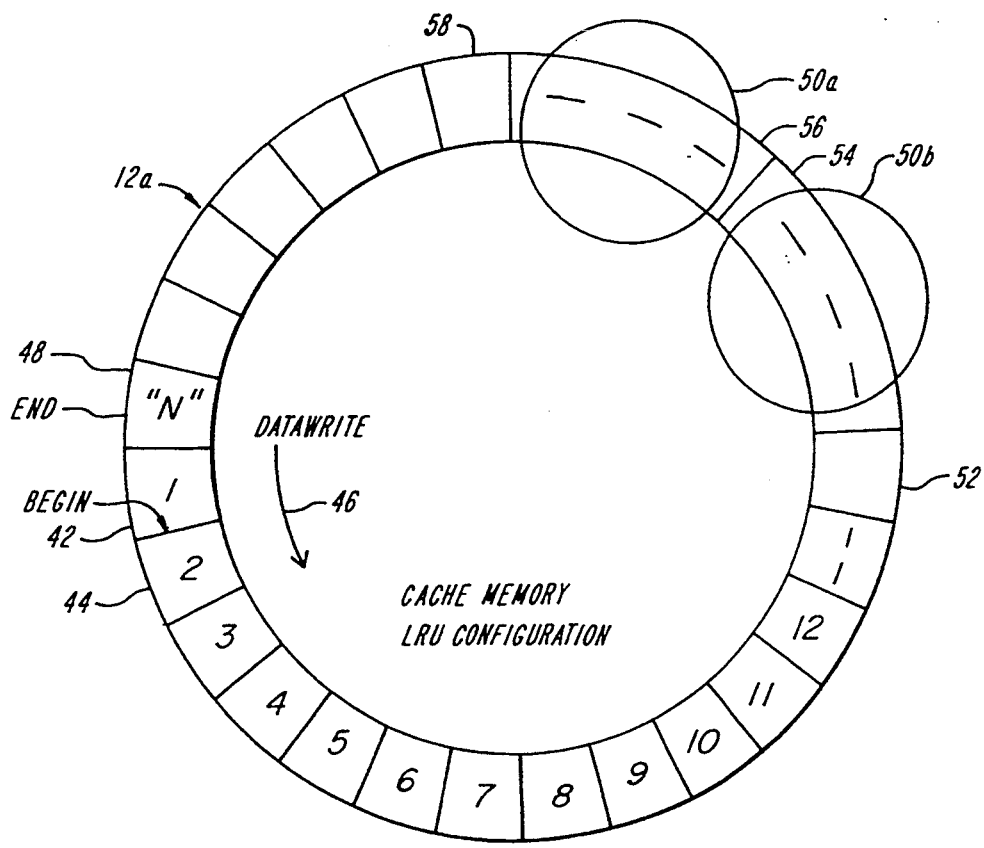
FIGS. 4A-4C illustrate the operation of the present cache manager.
Figure 4B:
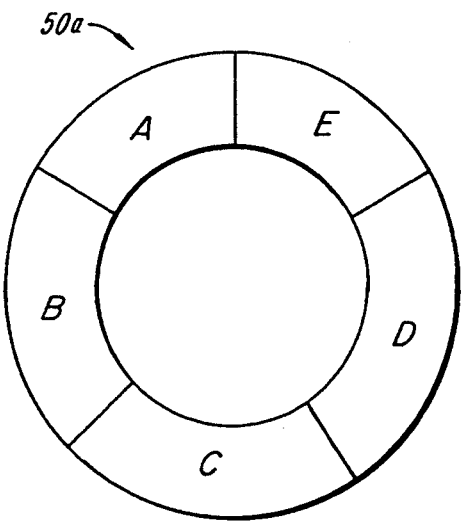
Figure 4C:
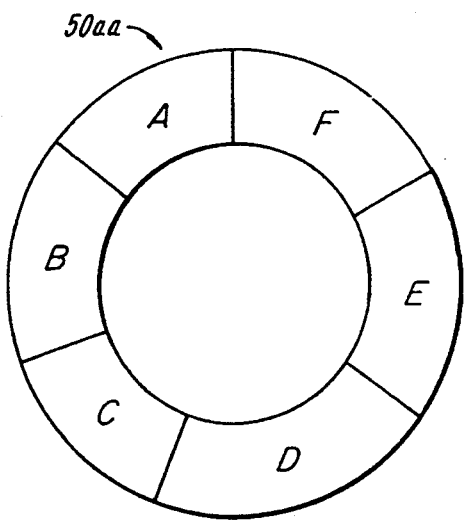

A further illustration useful in describing the present cache manager is shown in FIGS. 4A–4C wherein in FIG. 4A, cache memory 12a is shown in a least recently used (LRU) configuration. In such a configuration, which is well known to those skilled in the art, a predetermined number of main memory locations, which number is controllable by the system manager based upon cache usage, is allocated to cache in a "circular" fashion wherein a first record of data is written to a logical first block of memory 42, and a second data record written to the second logical block of memory 44.

Writing to cache memory proceeds around the "circular" cache memory in the direction indicated by arrow 46. Once data has been written to the last or "N" memory location 48, the cache management system overwrites or recycles the oldest or least recently used (LRU) memory location 42, and continues to overwrite previously used memory locations in sequence.

Use of the cache memory in such an LRU configuration proceeds until the present cache manager, utilizing the data storage device cache index/directory tables previously disclosed, determines that one or more processes accessing data on any given device has begun a sequential access. When such an indication is provided as shown previously in FIG. 3, the present cache manager establishes micro-cache memory configurations such as 50a and 50b shown in FIG. 4A, one such micro-cache for each sequential access in progress. The memory locations for such micro-cache memory configurations are reserved for use by a particular process from the total number of memory locations available to the main cache memory 12a. The present cache manager reserves memory locations from the main LRU by taking control of one or more LRU cache memory pointers which in essence, prevents the LRU from controlling the cache memory locations now associated with a particular micro-cache memory configuration. Once present cache manager determines that a micro-cache memory configuration is no longer necessary for a given particular process, the cache manager will return the memory locations to the main LRU by relinquishing or returning control of the pointers to the main LRU algorithm.

When the cache manager reserves such memory locations for use by one or more specific processes, the LRU algorithm utilized to manage the main cache memory 12a will utilize the memory location shown at 52, and subsequently skip those memory locations 50b reserved by the cache manager and then utilize the next available memory locations 54 and 56, before again skipping the next reserved memory locations 50a to utilize the next available memory location 58.

The "size" or number of memory locations allocated to each sequential process is determined by the third criteria or parameter utilized by the cache manager of the present invention namely, the number of blocks to allocate to the process. Thus, as shown in FIG. 4B, micro-cache memory configuration 50a includes five memory locations in this example, presuming that the third criteria was set or defaulted to five.

After detecting a sequential data access in progress by a given process and reserving a micro-cache memory configuration for the process, the cache manager begins by prefetching, one-by-one, a number of data records or tracks as indicated by the second criteria (i.e., the number of tracks or records to prefetch). Thus, the first prefetched record or track will be stored in memory location "A" within the micro-cache memory configuration 50a, while the second prefetched data track or record will be stored at memory location "B". When the host system has requested and read the data at memory location "A", the present cache manager will then prefetch another data record to be stored in memory location "C".

After the host uses the data in memory location "B", the cache manager will prefetch an additional data record and store it in memory location "D". Thus, as is now apparent, with the second criteria that is, the number to prefetch set at 2, the cache manager of the present invention will continuously keep two unused data records ahead of the last record used or read by the host system. Once memory location "E" has been filled with a data record, the cache manager will then overwrite or reuse the first previously used memory location "A". Thus, the process will continue to utilize the micro-cache memory configuration 50a reserved for this process.

It is important to note that the present cache manager continues to monitor data use by a given process and when an end of a sequential data access by a process is detected by non-use by the host of a data record stored in cache, the cache manager will return all of the reserved memory locations of a given micro-cache memory configuration to the main cache memory. Once a sequential operation has been detected, the cache manager, independent of the main cache management control method (whether it be an LRU control method or otherwise), controls the micro-cache memory for any sequential data access in progress by any given process without interference or intervention from the main cache control method.

An additional feature of the cache manager is the ability of the cache manager to monitor each process for which a micro-cache memory configuration has been reserved, and thus to monitor the effectiveness of the cache management control method controlling each and every sequential process, in an attempt to improve on the method.

Thus, the present cache manager is adapted to dynamically change or alter the user specified or default values of the first and second input criteria namely, the sequential access detection threshold, and the number of data tracks or records to prefetch. The third criteria or parameter namely, the size of the micro-cache memory to establish for each process, is not directly dynamically altered but instead, expands or contracts according to the number of tracks or records to prefetch, as will be explained in greater detail below.

Accordingly, the dynamic monitoring and adjustment feature of the present cache manager continuously monitors the cache index/directory once a sequential process has been detected to determine whether the tracks or data records which have been prefetched in anticipation of use by a given process, have in fact been used as anticipated. Since the cache index/directory includes a flag or bit for each data record which is reset once the data record is read or used, the cache manager can easily detect unused but prefetched data records.

Thus, when the dynamic monitoring and adjustment feature of the present cache manager detects many unused tracks or records which were prefetched, the dynamic monitoring and adjustment feature increases the sequential access detection threshold by one. Therefore, a previously set detection threshold of two would be increased to three. If additional unused prefetched data is again detected, indicating that the process may occasionally use three sequential data tracks or records but then not utilize the fourth or fifth sequential record, than the dynamic monitoring and adjustment feature will again increase the sequential access detection threshold by one to four. Thus, as long as the dynamic monitoring and adjustment feature detects unused tracks, the detection threshold will be increased.

Once the dynamic monitoring and adjustment feature of the present cache manager detects a large number or long continuous string of used data records or tracks, the detection threshold is decreased by one each cycle of the dynamic monitoring and adjustment feature, until unused tracks are again detected, thus causing the dynamic monitoring and adjustment feature to again begin increasing the sequential detection threshold. Accordingly, the sequential detection threshold "floats" at the optimum level for any given process. The dynamic monitoring and adjustment feature of the present cache manager is activated or invoked by the present cache manager based upon a threshold of the number of tracks per device which have been prefetched. For example, one implementation of the present invention contemplates invoking the dynamic monitoring and adjustment feature after fifty tracks per device have been prefetched.

The dynamic monitoring and adjustment feature of the present cache manager also monitors and dynamically adjusts the second criteria or parameter namely, the number of data tracks or records to be prefetched. Adjustment of the number of records to prefetch criteria is a function of the formula:

$$Y = \log 2X \quad (1)$$

wherein
Y = the number of data tracks or records to prefetch and
X = the number of previously used sequential tracks or data records.

Thus, as shown in Table 2 below, an initial default value of 2 data tracks or records to prefetch is not increased until 8 sequential data tracks or records have been prefetched and used. The upper boundary for the number of data tracks or records to prefetch is generally considered to be in the range of ten data tracks or records.

TABLE 2

| Records Used | Records To Prefetch |
|---|---|
| 4 | 2 |
| 8 | 3 |
| 16 | 4 |
| 32 | 5 |
| 64 | 6 |
| 128 | 7 |
| 256 | 8 |
| 512 | 9 |
| 1,024 | 10 |

A result of increasing tile number of data tracks or records to prefetch is that the dynamic monitoring and adjustment feature of the cache manager of the present invention will allow the size of the micro-cache memory configuration for a given process to fluctuate in size with a corresponding fluctuation in number of data tracks or records to prefetch. Thus, as shown by micro-cache memory configuration 50aa, FIG. 4C, when the process which was previously utilizing micro-cache memory configuration 50a, FIG. 4B has its number of data tracks or records to prefetch criteria increased by one, one additional memory location "F" is added to the "loop" to allow for this increased in number of data records. Thus, although the third criteria is not altered, the size of the micro-cache memory configuration servicing any given process is allowed to increase with a corresponding increase in number of data or tracks to prefetch, and to decrease, down to the minimum initial default number specified for the device, with subsequent decreases in number of data tracks or records to prefetch.

Figure 5:
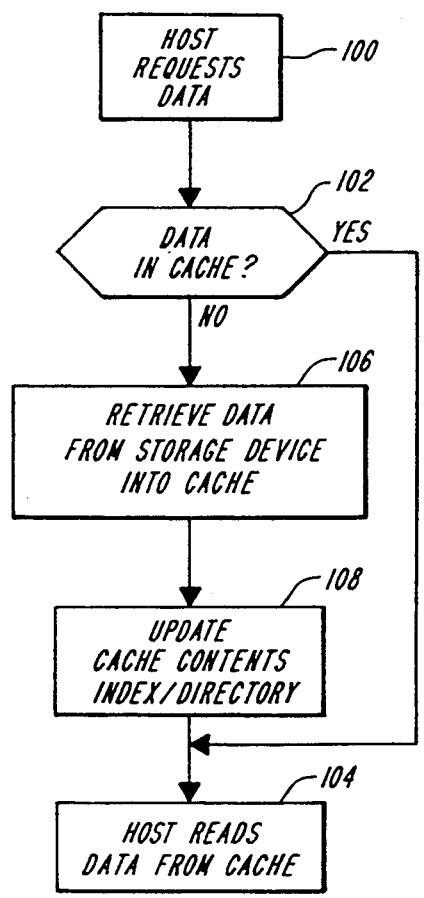
FIG. 5 is a flowchart illustrating data access by a host coupled to a data processing system incorporating the present cache management system and method.

A method for monitoring and controlling the contents of cache memory utilizing the cache manager is also disclosed. The method includes requesting data by at least-one host coupled to the system step 100, FIG. 5 followed by determination by the host adapter of whether the requested data is in cache, step 102. If the requested data is in cache memory, the host reads the data from cache, step 104.

If, at step 102, a determination is made that the data is not in cache, the host controller instructs the device controller to retrieve the data from the data storage device. The retrieved data is stored in cache memory, step 106 and the cache contents index directory updated, step 108.

Figure 6:
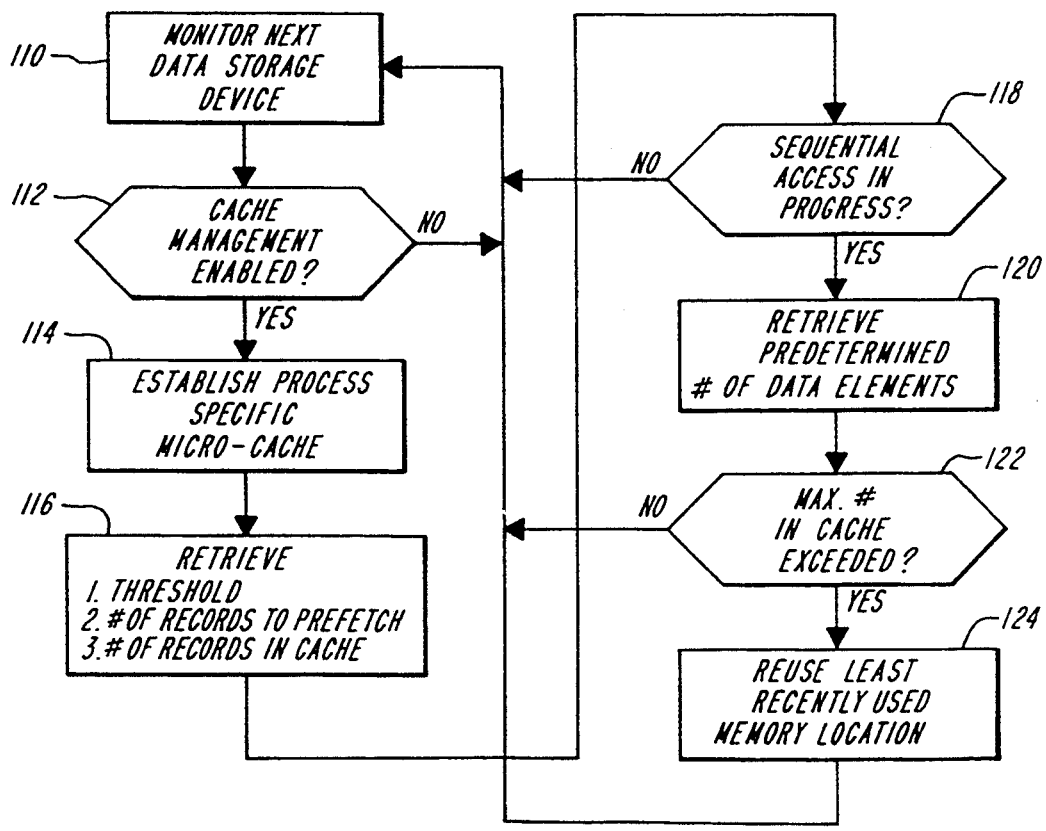
FIG. 6 is a flowchart illustrating the operation of the present cache management system.

Continuously and generally concurrently with the host requesting data from one or more data storage devices, the present cache manager monitors a first data storage device, step 110, FIG. 6, and verifies that the user has enabled cache management for the particular data storage device, step 112. Three parameters are next retrieved, namely (1) the sequential access threshold; (2) the maximum number of data elements to be prefetched; and (3) the maximum number of sequential data elements to be maintained in cache for this particular process, step 114. After the in cache and used flags of the cache index/directory for the given data storage device being monitored are scanned, the sequential data access indicator determines whether or not a sequential data access is in progress, step 116. If a sequential data access is not in progress by any given process on the device being presently monitored, another data storage device is monitored.

If, at step 116, the sequential data access indicator indicates that a sequential data access is in progress by at least one process accessing the data storage device, the method utilizing the cache manager of the present invention proceeds to step 118 to retrieve, one data element or track at a time, up to the predetermined maximum number of data elements or tracks to be prefetched as established by the second criteria.

At step 120, a determination is made as to whether the maximum number of data elements in cache selected by the user as the third parameter has been exceeded. If this maximum number will not be exceeded by storing in the micro-cache of a particular process the current prefetched data element or track, the data element or track is written to the next sequential micro-cache memory location. If however, at step 120, the system determines that the maximum number of sequential data elements in cache will be exceeded by writing the given data element or track to the process's micro-cache, the present method replaces or re-uses the least recently used memory location in the micro-cache, step 122. Subsequently, another data storage device is monitored, step 110.

Figure 7:
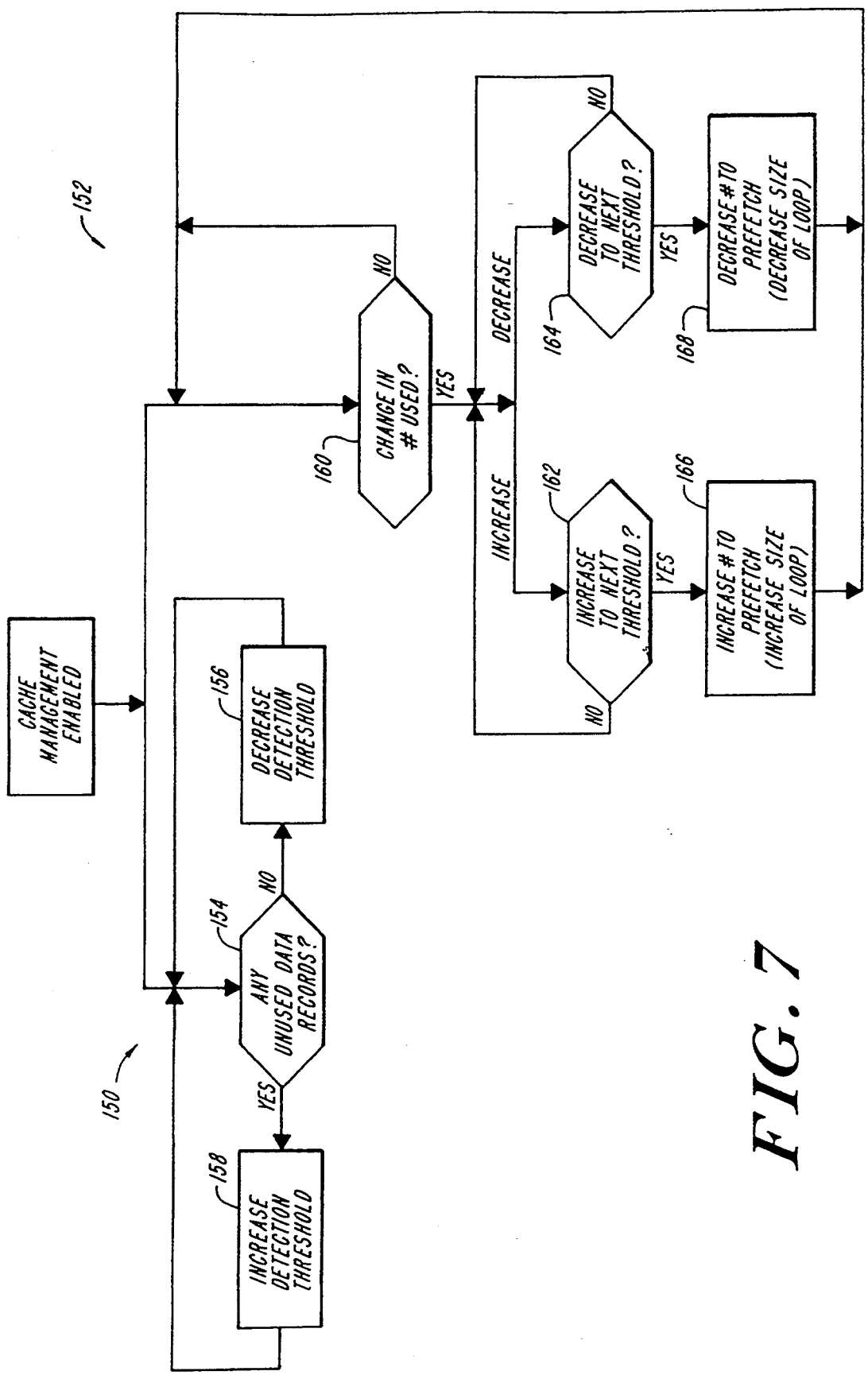
FIG. 7 is a flowchart illustrating the operation of the dynamic monitoring and adjustment feature of the present cache manager.

A further feature of the present invention is the dynamic monitoring and adjustment feature of the cache manager of the present invention as previously described. FIG. 7 is a flowchart which illustrates the two parallel and generally simultaneous dynamic monitoring and adjustment procedures 150, 152 undertaken by this feature of the present invention if cache management is enabled for at least one data storage device coupled to the system.

As shown in the dynamic monitoring and adjustment procedure 150, the method of dynamically monitoring and adjusting the cache management parameters includes sequentially monitoring the cache index/directory data used flags for each data storage device to detect any unused data tracks or records, step 154. If no unused data records or tracks stored in cache memory are detected, the dynamic monitoring and adjustment procedure decreases the sequential access detection threshold (the first parameter), step 156, and returns to monitor for any unused data records for the next device. If, however, the procedure detects any unused data tracks or records at step 154, the procedure continues to step 158 wherein the sequential access detection threshold (the first parameter) is increased by one, with the procedure returning to monitor the device cache index/directory for any additional unused data tracks or records.

Generally simultaneously with and in parallel with the monitoring procedure described above, the dynamic monitoring and adjustment feature of the cache manager also executes the procedure indicated generally by 152 which includes monitoring the cache index/directory for any change in the total number of used sequential data tracks or records which were prefetched by any given process executing on the device, step 160. If no change in the total number of used records or tracks is detected, no adjustments to the cache manager criteria are made.

If, however, a change in the total number of tracks or records is detected at step 160, the dynamic monitoring and adjustment feature proceeds to one of steps 162 in the case of an increase in the total number of data tracks or records used, or to step 164 in the case of a decrease in the total number of data tracks or records used.

In the case of an increase in the total number of data tracks or records used, the dynamic monitoring and adjustment feature of the present cache manager determines at step 162 if the increase in the total number of data tracks or records used has reached the next threshold as previously described in conjunction with Table I. If the increase has reached the next threshold, processing continues to step 166, wherein the second criteria of the cache manager namely, the number of data tracks or records to prefetch is increased by one. In addition, the third criteria namely, the number of data records or tracks to maintain in the micro-cache "loop" for the given process is also increased by one with processing returning to step 160 to detect any change in the total number of data tracks or records used.

If a decrease in the total number of data tracks or records used is detected at step 160, the dynamic monitoring and adjustment feature of the present cache manager determines at step 164 if the total number of data tracks or records has decreased to the next threshold and if so, processing continues to step 168 wherein the number of data tracks or records to prefetch (the second criteria) of the cache manager is decreased by one. Also at this step in the procedure, the actual number of memory locations in the processes micro-cache memory "loop" will also be decreased by one if it currently exceeds the predetermined number of memory locations established by the user as the third criteria or parameter. Subsequently, processing returns to step 160 to monitor and detect any change in total number of unused data tracks or records.

Modifications and substitutions by one of ordinary skill in the art are considered to be within the scope of the present invention which is not to be limited except by the claims which follow.

What is claimed is:

1. A cache management system, for monitoring and controlling contents of cache memory coupled to at least one host and to at least one data storage device, said cache management system comprising:
   a cache indexer, for maintaining a cache index of data elements which are retrieved from said at least one data storage device by said at least one host and stored in said cache memory;
   a sequential data access indicator, responsive to said cache index, for detecting a plurality of sequential data elements retrieved from said at least one data storage device and stored in said cache memory, and responsive to said detection of a plurality of sequential data elements retrieved from said at least one data storage device and stored in cache memory and to a user selectable sequential data access indicator threshold value, for providing an indication that at least one process executing on said at least one host is effecting a sequential data access;
   a data retrieval requestor, responsive to said indication that at least one process executing on said at least one host is effecting a sequential data access and to a user selectable value of a predetermined number of data elements to be prefetched, for requesting retrieval from said at least one data storage device of up to a number of data elements equal to the value of said user selectable predetermined number of data elements to be prefetched;
   a cache data replacer, responsive to a user selectable value of a predetermined maximum number of sequential data elements to be stored in said cache memory for use by said at least one process effecting a sequential data access, and to said data retrieval requestor requesting retrieval of a data element, for requesting replacement of a least recently used sequential data element stored in said cache memory in excess of the value of said predetermined maximum number to be stored for use by said at least one process upon each retrieval of a data element in excess of said predetermined maximum number previously stored in said cache memory for use by said at least one process; and
   a dynamic cache management system adjuster, responsive to said indication that at least one process executing on said at least one host is effecting a sequential data access, for dynamically adjusting at least the values of said user selectable sequential data access indicator threshold and said user selectable predetermined number of data elements to be prefetched.

2. A cache management system including a cache manager, for monitoring and controlling contents of cache memory coupled to at least one host and to at least one data storage device, said cache management system comprising:
   a cache indexer, for maintaining a cache index of data elements which are retrieved from said at least one data storage device by said at least one host and stored in said cache memory;
   a sequential data access indicator, responsive to said cache index, for detecting a plurality of sequential data elements retrieved from said at least one data storage device and stored in said cache memory, and responsive to said detection of a plurality of sequential data element retrieved from said at least one data storage device and stored in cache memory and to a user selectable sequential data access indicator threshold value, for providing an indication that at least one process executing on said at least one host is effecting a sequential data access;
   a data retrieval requestor, responsive to said indication that at least one process executing on said at least one host is effecting a sequential data access and to a user selectable value of a predetermined number of data elements to be prefetched, for requesting retrieval from said at least one data storage device of up to a number of data elements equal to the value of said user selectable predetermined number of data elements to be prefetched; and a cache data replacer, responsive to a user selectable value of a predetermined maximum number of sequential data elements to be stored in said cache memory for use by said at least one process effecting a sequential data access, and to said data retrieval requestor requesting retrieval of a data element, for requesting replacement of a least recently used sequential data element stored in said cache memory in excess of the value of said predetermined maximum number to be stored for use by said at least one process upon each retrieval of a data element in excess of said predetermined maximum number currently stored in said cache memory for use by said at least one process.

3. The cache management system of claim 2 wherein said cache management system includes a plurality of coupled data storage devices; and wherein said cache indexer maintains only one cache index.

4. The cache management system of claim 3 wherein said one cache index is organized on a data storage device by data storage device basis.

5. The cache management system of claim 4 wherein said selectable sequential data access indicator threshold value and the value of said selectable predetermined number of data elements to be prefetched are user selectable for each data storage device coupled to the cache management system.

6. The cache management system of claim 2 wherein said cache indexer maintains a cache index for each data storage device coupled to said cache management system.

7. The cache management system of claim 2 wherein each of said data elements retrieved from said at least one data storage device include an individual data record.

8. The cache management system of claim 2 wherein each of said data elements retrieved from said at least one data storage device include all data records stored in one data storage unit of said data storage device; and wherein said cache indexer maintains a current index of a plurality of data storage units stored in said cache memory.

9. The cache management system of claim 8 wherein said at least one data storage device includes at least one disk drive.

10. The cache management system of claim 9 wherein said data storage unit of said data storage device includes a disk drive track.

11. The cache management system of claim 9 wherein said data storage unit of said data storage device includes a disk drive cylinder.

12. The cache management system of claim 2 wherein said at least one data storage device includes at least one optical disk.

13. The cache management system of claim 2 wherein said cache memory includes a high-speed semiconductor memory.

14. The cache management system of claim 2 wherein said cache management system further includes at least one data storage device controller including said cache manager.

15. The cache management system of claim 2 wherein said cache management system further includes at least one host adapter including said cache manager.

16. The cache management system of claim 2 wherein said cache management system includes one system wide cache memory; and wherein said cache management system establishes and maintains at least one micro-cache memory having a predetermined number of memory locations for use by said at least one process effecting a sequential data access, said predetermined number of memory locations corresponding to said user selectable value of a predetermined maximum number of sequential data elements to be stored in said cache memory.

17. The cache management system of claim 16 wherein said data retrieval requestor requests storage of said prefetched data elements in said at least one micro-cache memory; and wherein said cache data replacer requests replacement of the least recently used sequential data element stored in said at least one micro-cache memory.

18. The cache management system of claim 16 wherein said cache management system includes a plurality of processes effecting a sequential data access; and wherein said cache management system establishes and maintains one micro-cache memory for each of said plurality of processes effecting a sequential data access.

19. The cache management system of claim 16 wherein said at least one micro-cache memory is established and maintained for exclusive use by only said at least one process during the effecting of a sequential data access.

20. The cache management system of claim 19 wherein said cache management system returns the predetermined number of memory locations of said at least one micro-cache memory to, and for use by, said system wide cache memory upon an indication of termination of a sequential data access in effect by said at least one process, said indication of the termination of a sequential data access provided by said sequential data access indicator upon detection of non-sequential data elements requested by said at least one process and stored in micro-cache memory.

21. The cache management system of claim 2 wherein said sequential data access indicator provides an indication of termination of a sequential data access in effect by said at least one process upon detection of non-sequential data elements requested by said at least one process and stored in said cache memory.

22. The cache management system of claim 2 wherein said cache index further includes an associated data-used bit having set and reset conditions, said reset condition providing an indication that a data element associated with said associated data-used bit has been retrieved from said at least one data storage device, stored in said cache memory, and used by said at least one process effecting a sequential data access.

23. The cache management system of claim 22 wherein each data-used bit is set upon the associated data element being stored in said cache memory.

24. The cache management system of claim 22 wherein each data-used bit is reset upon an associated data element being used by said at least one process effecting a sequential data access.

25. The cache management system of claim 22 wherein said sequential data access indicator provides an indication that said at least one process executing on said at least one host is effecting a sequential data access upon detecting a plurality of sequential data elements used by said at least one process in response to said reset condition of said data-used bit associated with said plurality of used data elements.

26. The cache management system of claim 22 wherein said cache management system further includes a dynamic cache management system adjuster, responsive to said indication that at least one process executing on said at least one host is effecting a sequential data access, for dynamically adjusting the values of said user selectable sequential data access indicator threshold and said user selectable predetermined number of data elements to be prefetched.

27. The cache management system of claim 26 wherein said dynamic cache management system adjuster increases the value of said user selectable sequential data access indicator threshold in response to a detection of unused data elements retrieved from said at least one data storage device and stored in said cache memory; and wherein said dynamic cache management system adjuster decreases the value of said user selectable sequential data access indicator threshold in response to an indication of no unused data elements retrieved from said at least one data storage device and stored in said cache memory.

28. The cache management system of claim 26 wherein said dynamic cache management system adjuster dynamically increases the value of said user selectable predetermined number of data elements to be prefetched in response to an increasing number of retrieved, stored and used data elements; and wherein said dynamic cache management system adjuster decreases the value of said user selectable predetermined number of data elements to be prefetched in response to a decreasing number of retrieved, stored and used data elements.

29. A cache management method, for monitoring and controlling contents of cache memory coupled to at least one host and to at least one data storage device, said cache management method comprising:

establishing and maintaining in said cache memory, a current index of the contents of said cache memory;

establishing an alterable, sequential data access indicator threshold value, for providing a predetermined minimum number of data elements stored in said cache memory indicating an occurrence of a sequential data access in progress by at least one process executing on said at least one host;

reading said current index of the contents of said cache memory;

determining that at least one sequential data access is in progress by said at least one process in response to reading said current index of the contents of said cache memory and to said sequential data access indicator threshold value;

establishing a first alterable value corresponding to a predetermined number of data elements to be prefetched from said at least one data storage device;

requesting retrieval and storage in said cache memory of a number of data elements equal to said established value of predetermined number of data elements to be prefetched and stored in cache memory in response to the determination of a sequential data access in progress;

establishing a second alterable value corresponding to a predetermined maximum number of sequential data elements to be stored in said cache memory; and requesting replacement of a least recently used sequential data element stored in said cache memory in excess of said predetermined maximum number previously stored in said cache memory for use by said at least one process in response to said established second alterable value of predetermined maximum number of sequential data elements to be stored in said cache memory.

30. The cache management method of claim 29 further including after the step of determining that at least one sequential data access is in progress, the step of:

establishing and maintaining at least one micro-cache memory having a predetermined number of memory locations for use by said at least one process determined to be effecting a sequential data access, said predetermined number of memory locations corresponding to said second alterable value of a predetermined maximum number of sequential data elements to be stored in said cache memory.

31. The cache management method of claim 30 wherein said step of requesting retrieval and storage requests storage of said data elements in said at least one micro-cache memory; and wherein said step of requesting replacement requests replacement of the least recently used sequential data element stored in said at least one micro-cache memory.

32. The cache management method of claim 30 wherein said method of establishing and maintaining at least one micro-cache memory establishes and maintains one micro-cache memory for each of a plurality of processes executing on said at least one host system and effecting at sequential data access.

33. The cache management method of claim 30 wherein the step of establishing and maintaining at least one micro-cache memory establishes and maintains said at least one micro-cache memory for exclusive use by only said at least one process during the effecting of a sequential data access.

34. The cache management method of claim 33 further including after the step of requesting replacement, the step of:

returning the predetermined number of memory locations of said at least one micro-cache memory to, and for use by, a system wide cache memory upon an indication of termination of a sequential data access in progress by said at least one process, said indication of the termination of a sequential data access provided by said step of determining that at least one sequential data access is in progress.

35. The cache management method of claim 29 further including after the step of requesting replacement, the step of:

dynamically monitoring and adjusting the cache management method, said step of dynamically monitoring and adjusting comprising the steps of:

dynamically adjusting at least the values of said data access indicator threshold value and said first alterable value corresponding to a predetermined number of data elements to be prefetched.

36. The cache management method of claim 35 wherein the step of dynamically monitoring and adjusting the cache management system further includes the steps of:

increasing the value of said sequential data access indicator threshold in response to detecting unused data elements retrieved from said at least one data storage device and stored in said cache memory; and decreasing the value of said sequential data access indicator threshold in response to detecting no unused data elements retrieved from said at least one data storage device and stored in said cache memory.

37. The cache management method of claim 35 wherein said step of dynamically monitoring and adjusting further includes the steps of:

increasing the value of said predetermined number of data elements to be prefetched in response to an increasing number of retrieved, stored and used data elements; and decreasing the value of said predetermined number of data elements to be prefetched in response to a decreasing number of retrieved, stored and used data elements.

38. The cache management method of claim 29 wherein the step of establishing said alterable sequential data access indicator threshold value includes the step of user selecting and establishing said alterable sequential data access indicator threshold value.

39. The cache management method of claim 29 wherein the step of establishing said first alterable value corresponding to a predetermined number of data elements to be prefetched from said at least one data storage device includes the step of user selecting and establishing said first alterable value corresponding to a predetermined number of data elements to be prefetched from said at least one data storage device.

40. The cache management method of claim 29 wherein the step of establishing said second alterable value corresponding to a predetermined maximum number of sequential data elements to be stored in said cache memory includes the step of user selecting and establishing said second alterable value corresponding to a predetermined maximum number of sequential data elements to be stored in said cache memory.

* * * * *